Sept. 7, 1937.　　　　M. L. DODGE　　　　2,092,109
MACHINE FOR WEIGHING AND SORTING FILLED CANS
Filed June 13, 1934　　　11 Sheets-Sheet 1

Inventor:
Merton L. Dodge,
By Sturtevant Mason
Attorneys

Sept. 7, 1937.  M. L. DODGE  2,092,109
MACHINE FOR WEIGHING AND SORTING FILLED CANS
Filed June 13, 1934   11 Sheets-Sheet 2

Inventor:
Merton L. Dodge,
By Sturtevant & Mason
Attorneys.

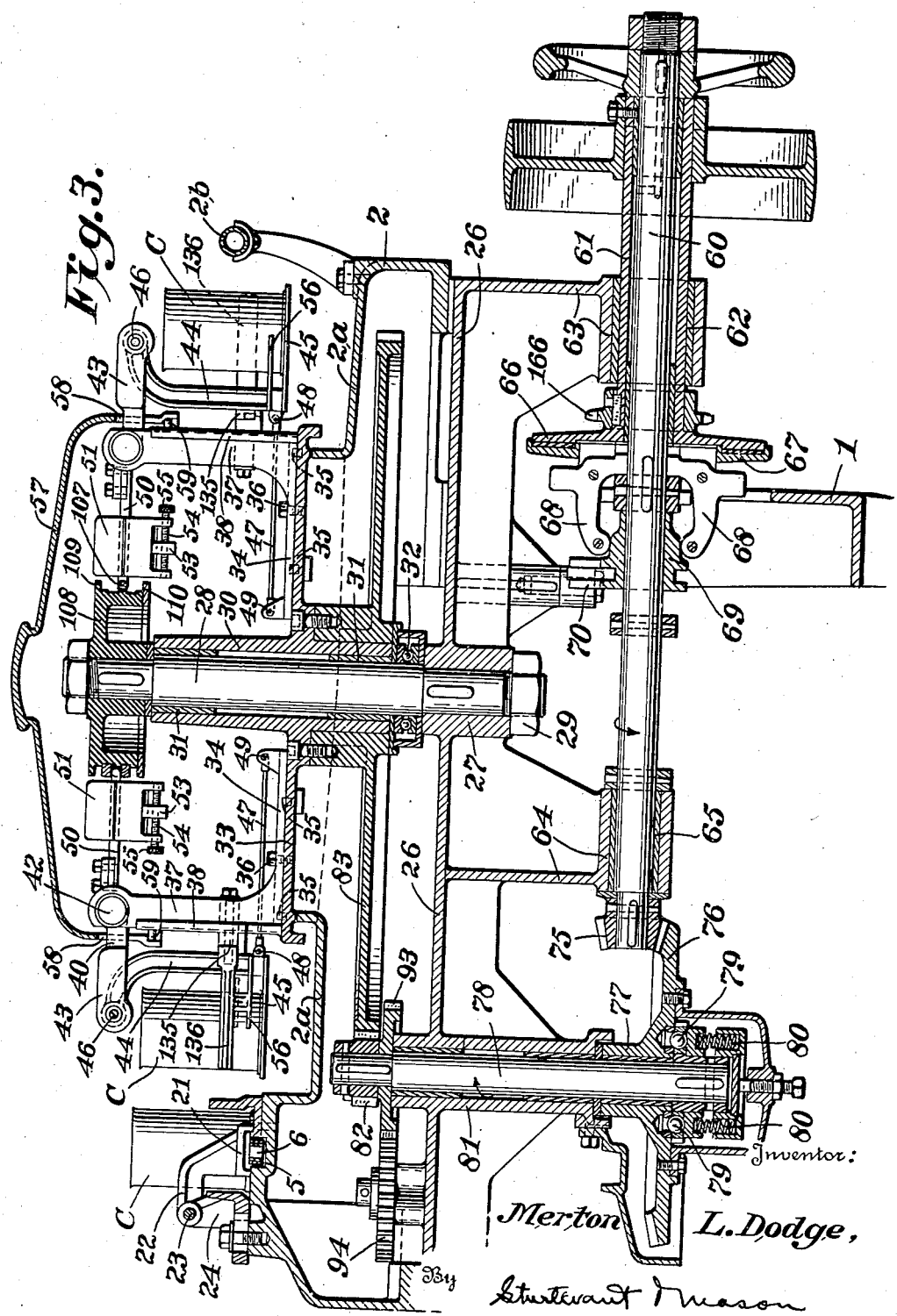

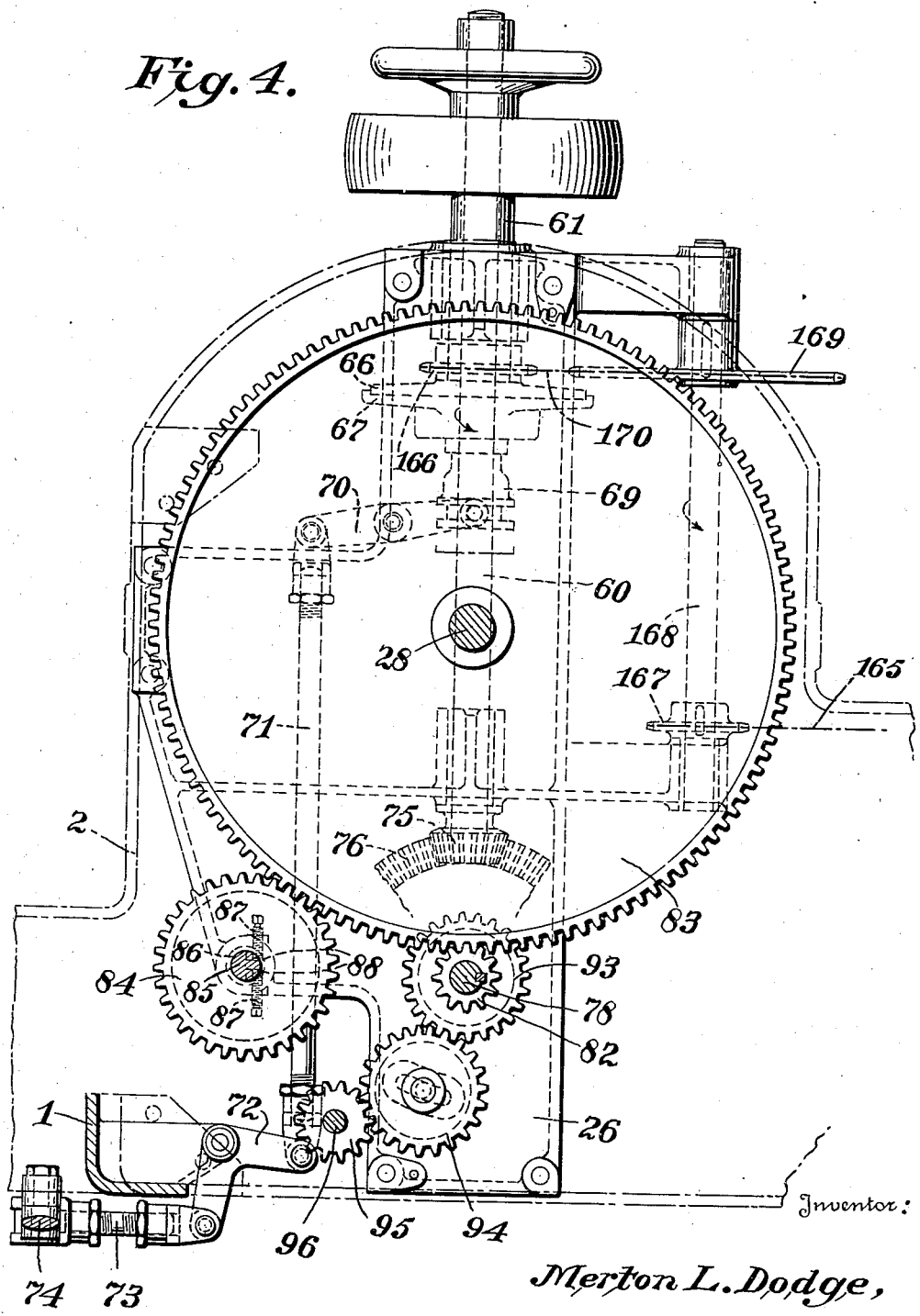

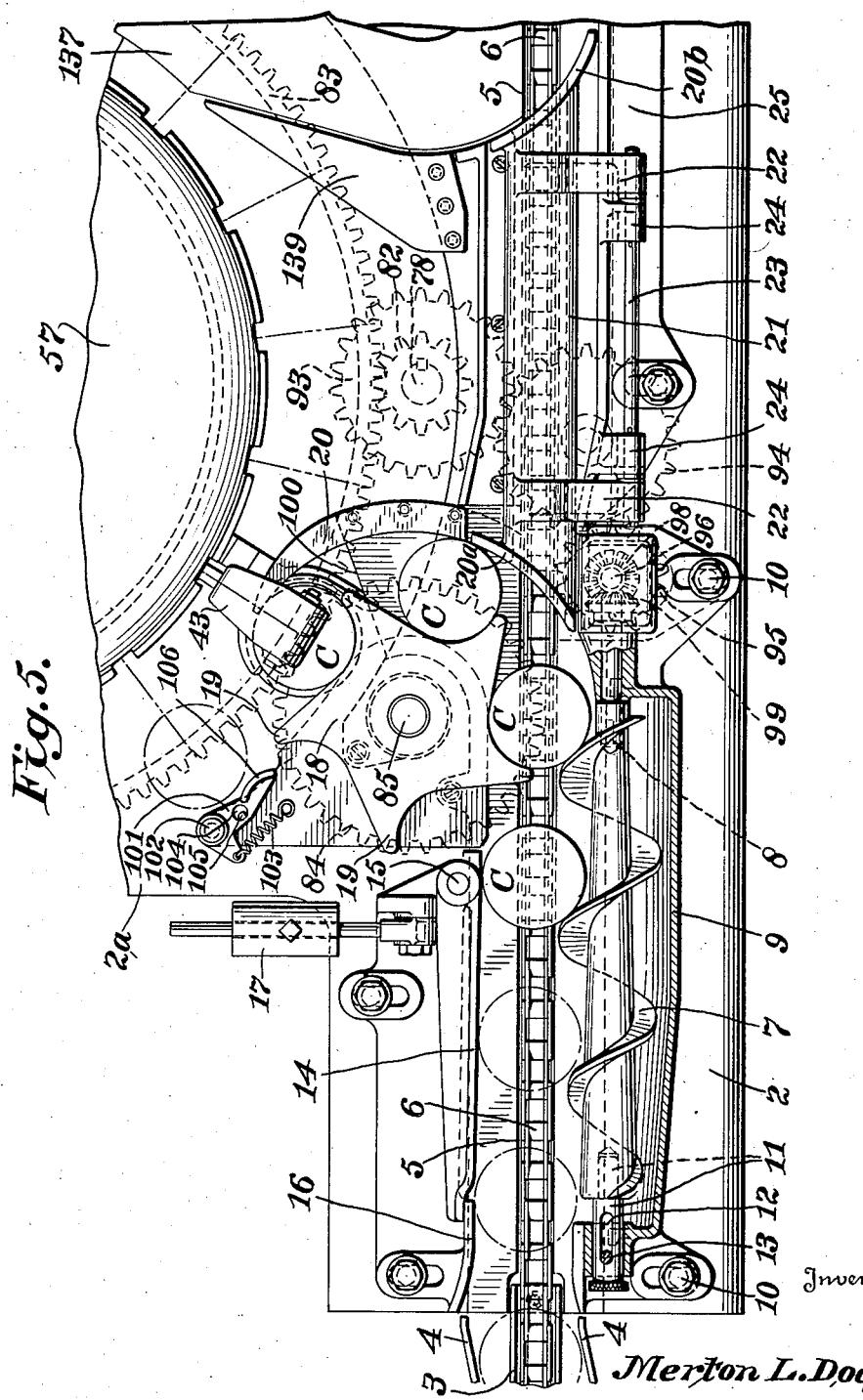

Sept. 7, 1937. M. L. DODGE 2,092,109
MACHINE FOR WEIGHING AND SORTING FILLED CANS
Filed June 13, 1934 11 Sheets-Sheet 6
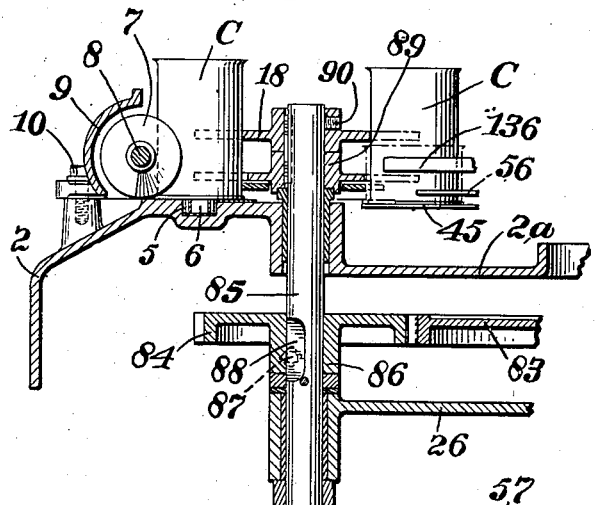
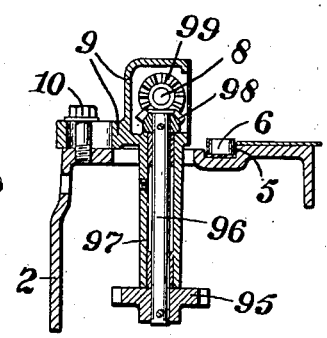
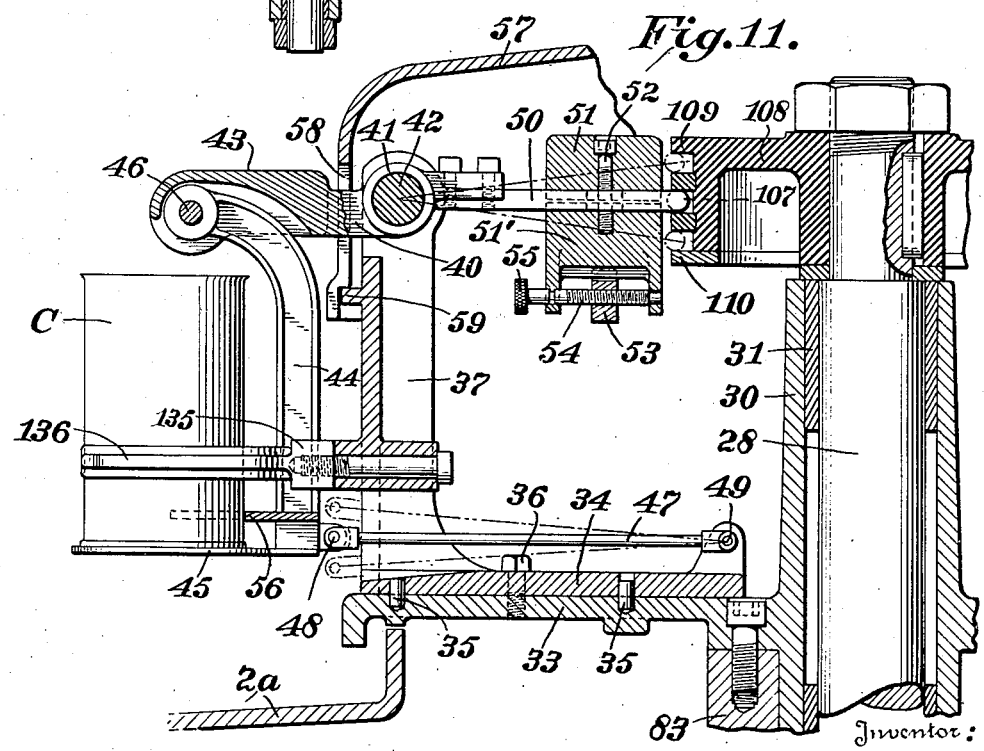
Inventor:
Merton L. Dodge,
By Sturtevant Mason
Attorneys.

Sept. 7, 1937.  M. L. DODGE  2,092,109
MACHINE FOR WEIGHING AND SORTING FILLED CANS
Filed June 13, 1934   11 Sheets-Sheet 7

Inventor:
Merton L. Dodge,
By Sturtevant Mason
Attorneys.

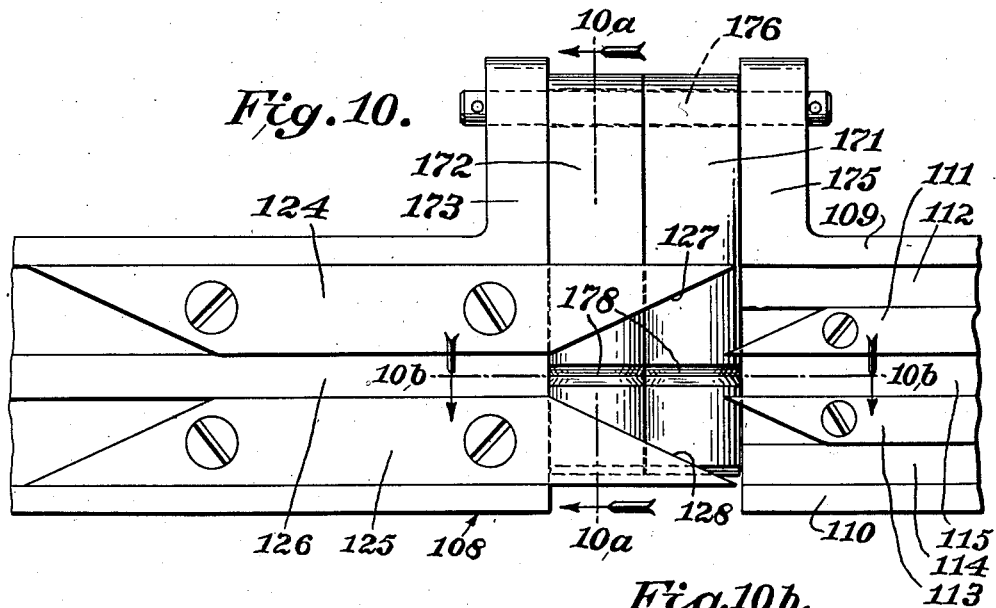
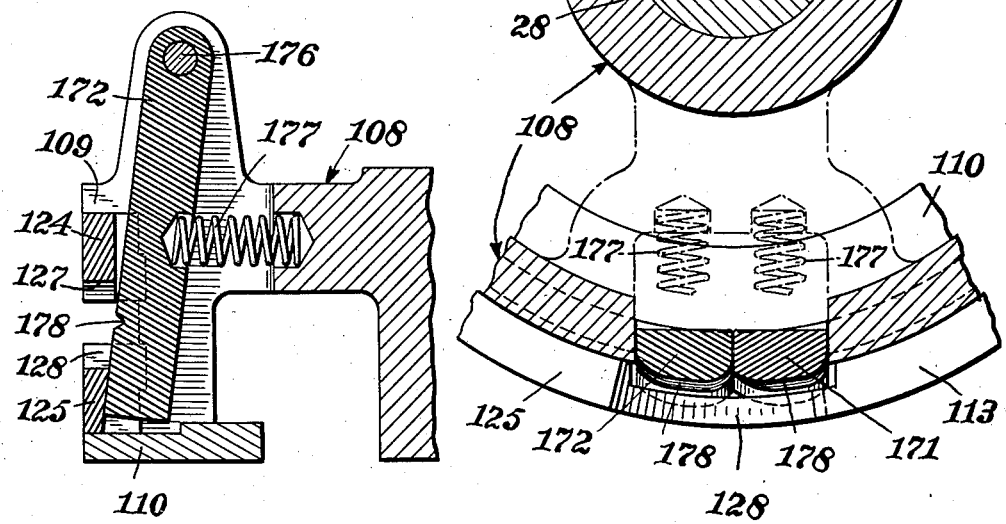

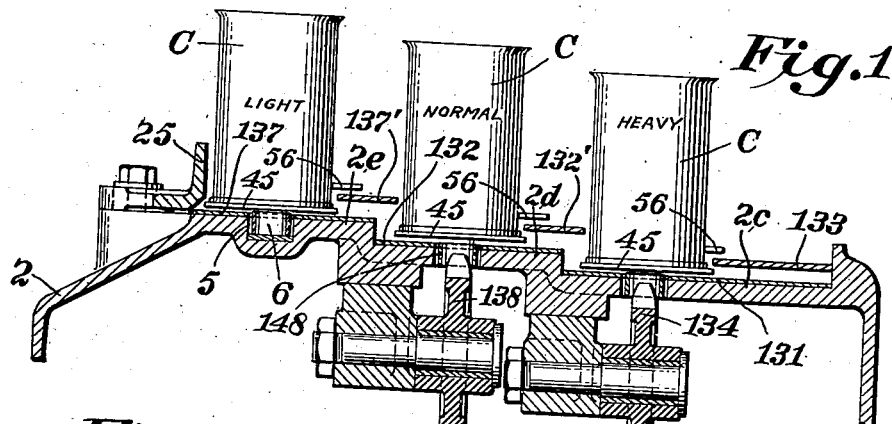
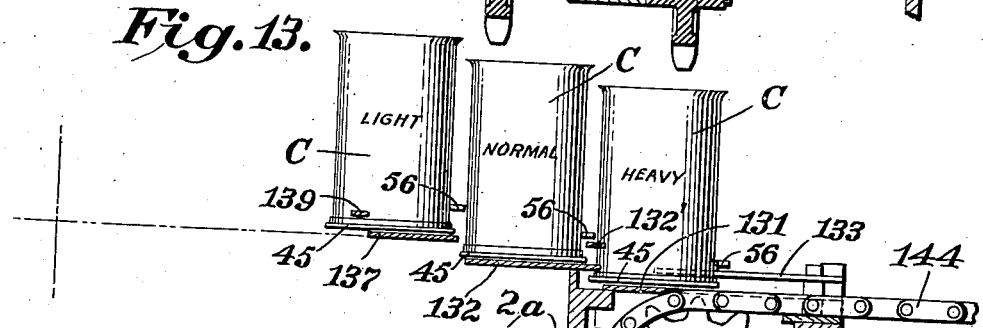
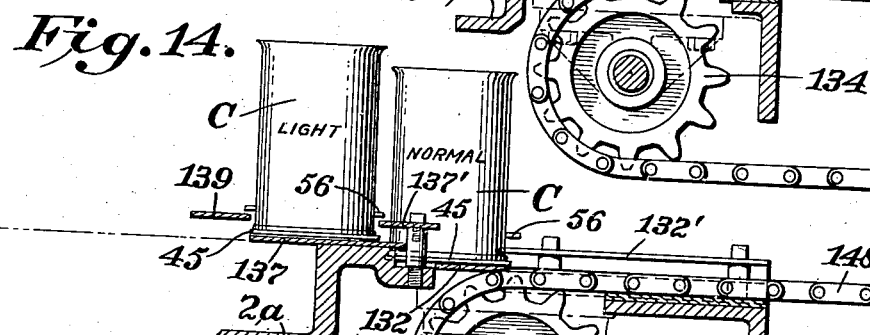
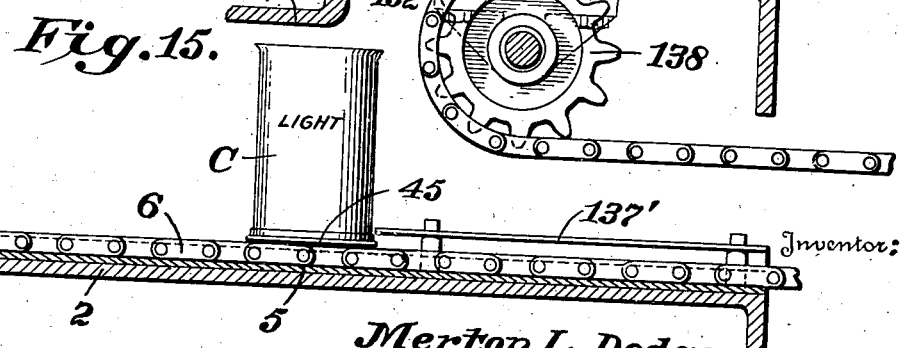

Sept. 7, 1937. M. L. DODGE 2,092,109
MACHINE FOR WEIGHING AND SORTING FILLED CANS
Filed June 13, 1934 11 Sheets-Sheet 10
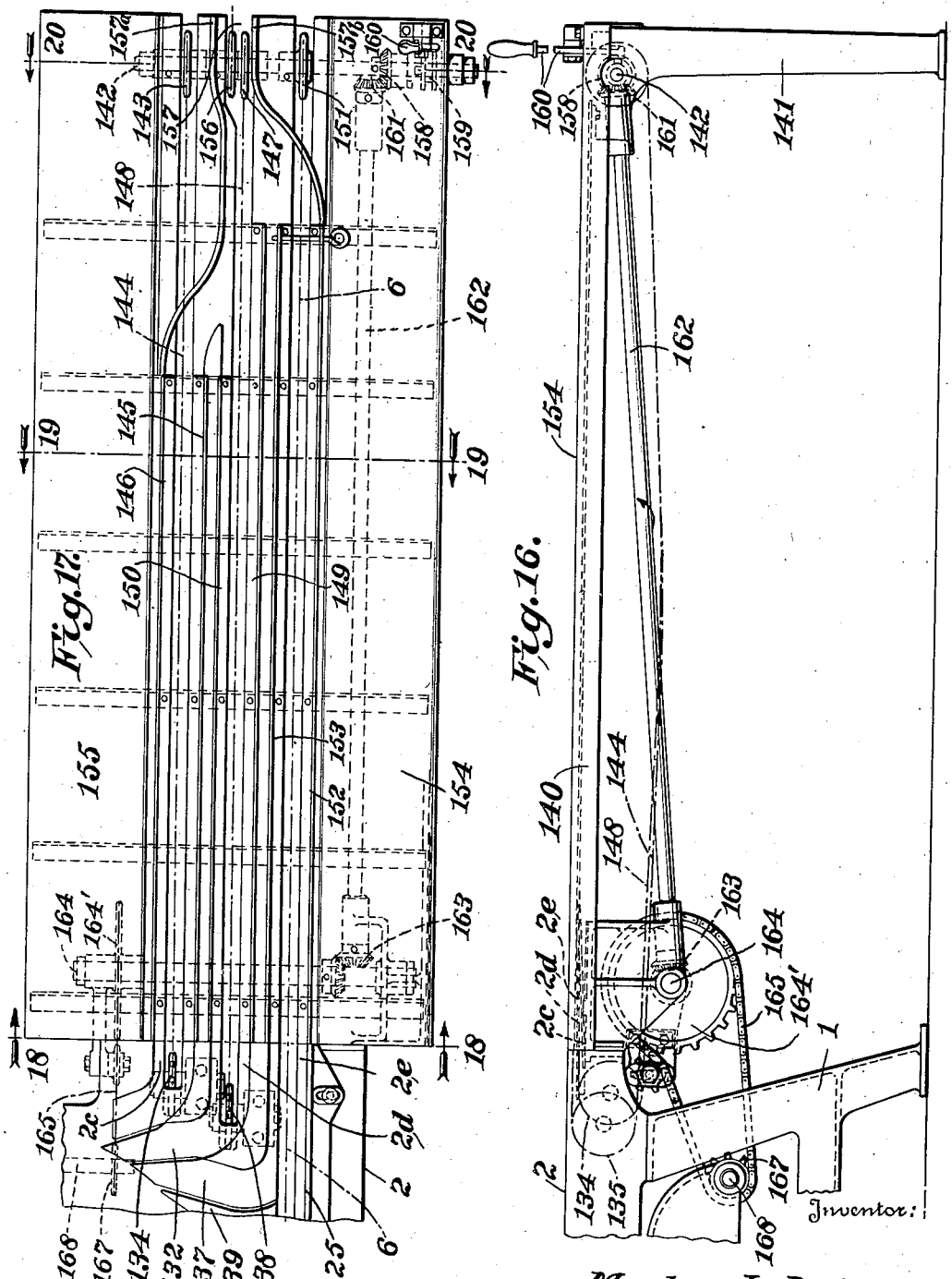
Inventor:
Merton L. Dodge,
By Sturtevant & Mason
Attorneys Sept. 7, 1937.　　　M. L. DODGE　　　2,092,109
MACHINE FOR WEIGHING AND SORTING FILLED CANS
Filed June 13, 1934　　11 Sheets-Sheet 11

Inventor:
Merton L. Dodge,
By Sturtevant Mason
Attorneys.

Patented Sept. 7, 1937

2,092,109

UNITED STATES PATENT OFFICE 2,092,109

MACHINE FOR WEIGHING AND SORTING FILLED CANS

Merton L. Dodge, Seattle, Wash., assignor to Continental Can Company, Inc., New York, N. Y., a corporation of New York Application June 13, 1934, Serial No. 730,526

10 Claims. (Cl. 209—121)

The invention relates to new and useful improvements in a machine for weighing and sorting filled cans according to the weight of the food product therein. Machines have been designed for receiving filled cans in succession from a filler, which machines weigh the cans and deliver the same at different points according to the weight of the food product contained therein. The cans of normal weight will be discharged at one point, those of light weight at another, and those of overweight at still another point. Considerable difficulty has been experienced in the feeding of the cans on to the weighing platforms of the weighing units, and in the removing of the cans from these weighing platforms, due to the fact that the weighing platforms are free to move at any time during the loading and the unloading thereof.

An object of the present invention is to provide a machine of the above type with means whereby the scale beams of the weighing units are positively held from movement during the loading of the can on to the weighing platform and during the removing of the cans from said platforms, and are released so as to assume a position determined by the weight of the food product in the can after leaving the feeding-in station and before reaching the discharge station.

A further object of the invention is to provide a machine of the above type with automatic means for returning all of the weighing platforms to a single fixed path of travel for the loading of the cans on to the weighing platforms.

A still further object of the invention is to provide a machine of the above type with a table along which the cans after they are discharged from the weighing machine are passed in assorted lines so that the cans of light weight may have food product added thereto and the cans of over-weight may have food product taken therefrom, after which all of the cans are brought to a single line of travel.

A still further object of the invention is to provide a machine of the above type wherein the weighing means for each can is in the form of a unit which may be quickly removed from the machine and replaced without disturbing the other weighing units or the operating mechanism associated therewith.

A still further object of the invention is to provide a machine of the above type which can be quickly converted so that the cans may be caused to travel in a straight line past the weighing and sorting means and into the final discharging means of the machine.

These and other objects will in part be obvious and will in part be hereinafter more fully described.

In the drawings which show by way of illustration one embodiment of the invention—

Fig. 3 is a sectional view on the line 3—3 of Fig. 2;

Fig. 4 is a view partly in plan and partly in section and showing more or less diagrammatically the operating mechanism for the main parts of the machine and the arrangement thereof relative to the machine;

Fig. 5 is a fragmentary enlarged plan view of a portion of the machine and showing the feeding-in mechanism and the removable guide sections associated therewith;

Fig. 6 is a sectional view on the line 6—6 of Fig. 2;

Fig. 7 is a sectional view on the line 7—7 of Fig. 2;

Fig. 10 is an enlarged detail showing the friction bars for controlling the movement of the scale beam as it is brought to a position to enter the common track along which it moves for loading;

Fig. 10a is a sectional view on the line 10a—10a of Fig. 10;

Fig. 10b is a sectional view on the line 10b—10b of Fig. 10;

Fig. 11 is a vertical sectional view through one of the weighing units;

Fig. 12 is a sectional view on the line 12—12 of Fig. 2;

Fig. 13 is a sectional view on the line 13—13 of Fig. 2;

Fig. 14 is a sectional view on the line 14—14 of Fig. 2;

Fig. 15 is a sectional view on the line 15—15 of Fig. 2;

Fig. 16 is a side view of the delivery end of the machine and showing the patching table associated therewith;

Fig. 17 is a plan view of the parts shown in Fig. 16;

The machine embodying the improvements includes a supporting frame 1 on which is mounted the weighing and sorting means and also the conveying means for conveying the cans in succession to and from the weighing and sorting means. At the upper portion of this frame 1 is a table 2. Extending to the right of the table 2 is a runway 3 with which guide rails 4 are associated, and the filled cans as they come from the filler are passed along this runway into the timing mechanism of the weighing and sorting machine and are delivered thereby to the weighing units as they travel continuously past the loading station.

Figure 1:
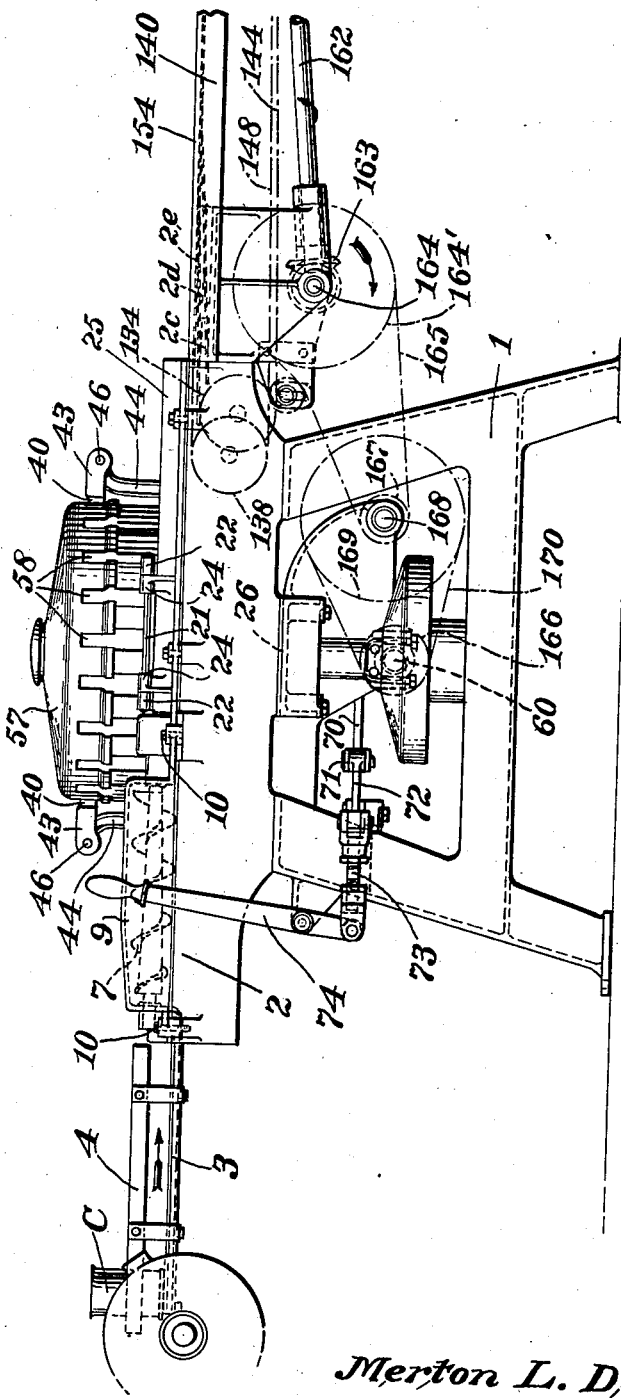
Figure 1 is a side view of a machine embodying the improvements with portions of the weighing units broken away for the sake of clearness.
Figure 2:
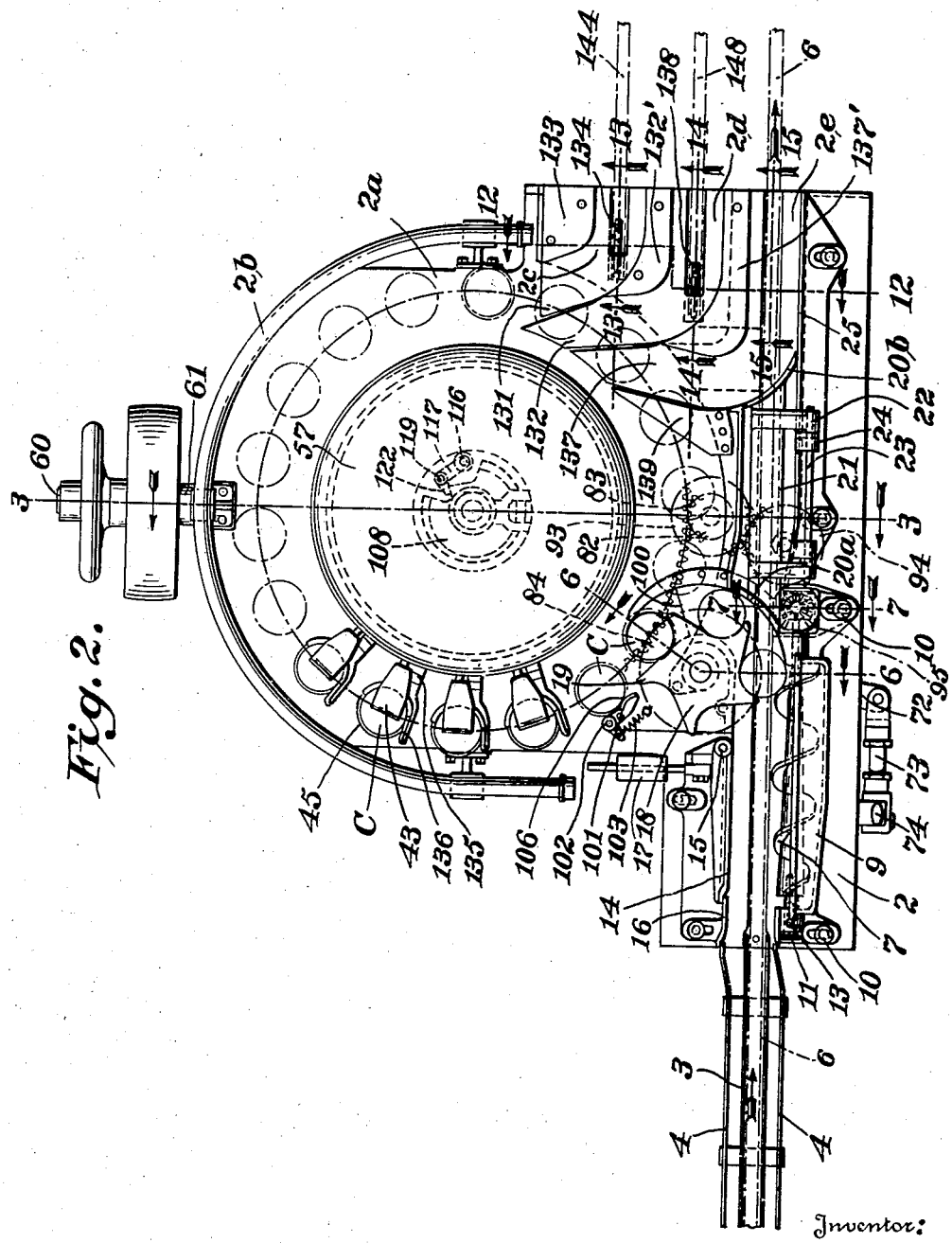
Fig. 2 is a plan view of the main portion of the machine, with certain of the weighing units shown in full lines and the position of the others indicated diagrammatically.

The filled cans are indicated at C in the drawings, and in Fig. 1, only one can is shown for the sake of clearness. There is a traveling chain which frictionally conveys the cans along the runway. The table 2 is provided with a channel 5 extending from one end to the other thereof, and the conveying chain which delivers the filled cans into the machine passes along this channel. The conveying chain is indicated at 6 in Fig. 3 of the drawings, but has been omitted from Fig. 2 for the sake of clearness. The cans are first delivered to a timing mechanism which includes a conveyor screw 7. This combined conveyor and timing screw is of the usual construction and operates to receive the cans fed thereto by the conveyor chain, and delivers the filled cans in a predetermined time relation to each other. This timing screw is mounted on the end of a shaft 8 which is the actuating shaft for the timing screw. This shaft is journaled in a bracket 9 attached to the table by bolts 10, 10 which pass through slots in the bracket and provide a means whereby the bracket may be shifted laterally toward and from the path of travel of the cans. This is for placing the timing screw so that it may operate upon cans of different sizes. The other end of the timing screw is mounted on a bearing pin 11 which is slidably mounted in the bracket 9. Said bearing pin has a groove 12 formed in the side face thereof with which a set screw 13 is adapted to engage. By loosening the set screw, the bearing pin may be moved endwise so as to withdraw it from the timing screw, and this permits the left-hand end of the timing screw to be moved axially and the timing screw withdrawn from its connection to the end of the shaft 8. The set screw 13 is only released sufficiently to permit the movement of the bearing pin in an endwise direction, and the ends of the groove in the bearing pin will limit its movement. Opposed to the timing screw is a guide 14 pivoted at 15 and yieldingly pressed against a stop 16 by a weight 17. This yielding guide cooperates with the timing screw in the usual manner to aid in the placing of the cans properly therein and the spacing of the cans for the operation of the timing screw thereon.

The timing screw delivers the cans to the feed wheel 18. Said feed wheel 18 is provided with a series of feed fingers 19, and between the feed fingers the wheel is cut away to form pockets which receive the cans from the timing screw. As this feed wheel rotates, it will cause the cans to move in a circular path along the guide rails 20a and 20 and be delivered one at a time to the weighing units. The guide rail 20 is formed in two sections. The section 20a is formed as a part of a cover plate 21 which overlies the channel in which the feed chain 6 travels. This cover plate is provided with projecting arms 22, 22 which are in turn secured to a pivot rod 23 mounted in bearings 24, 24 carried by a bar 25 which is adjustably attached to the table so that it may be shifted toward and from the path of travel of the conveyor chain 6. The purpose of mounting this cover plate carrying the guide 20a on a pivot rod will be hereinafter more fully described. The outer section of this guide 20 is fixed to the table and remains in a set position.

The machine is provided with a series of weighing units which are mounted on a traveling turret, and these weighing units pass one after another the feeding-in station so that the filled cans are placed in succession on these traveling weighing units. The frame 1 includes a horizontal supporting member 26 on which the table 2 is mounted (see Fig. 3). This supporting member 26 is provided with a hub 27 to which is fixed a center column 28. Said center column is keyed to the hub and is secured therein by a nut 29. Mounted for rotation about this column is a turret which includes a sleeve 30 surrounding the column. Between said stationary column and the sleeve of the turret are bearing bushings 31, 31. At the lower end the sleeve rests on a ball bearing 32.

Projecting laterally from the sleeve 30 is a supporting member 33 on which the weighing units are mounted. Each weighing unit includes a base member 34 provided with dowel pins 35, 35 which engage recesses formed in the supporting member 33. This base member is secured to said support by bolts 36, 36. Projecting upwardly from the base member are two standards 37, 37 which are spaced from each other. Each standard is provided with a laterally projecting rib 38. Located between the standards are filler bars which have grooves in the side faces thereof adapted to engage the ribs. The purpose of the filler bars is to close the casing between the standards for the protection of the weighing units.

Mounted between the standards 37, 37 is the beam 40 of the weighing scale. This beam 40 is carried by a sleeve 41 mounted on a rod 42 which is journaled in bearings in the standards 37, 37. These bearings are preferably small stainless steel ball bearings. At the end of the scale beam is a supporting head 43. Suspended from this head 43 is a yoke member 44 carrying the weighing platform 45 on which the can is placed. Said yoke member 44 is carried by a pivot rod 46 journaled in bearings in the head 43, which bearings include small stainless steel balls. A link 47 is pivoted at 48 to the yoke member 44 and is pivoted at 49 to a lug carried by the base member 34. This link 47 is sufficiently long so that it does not, in any way, interfere with the free up and down movement of the yoke member 44 while it serves to stabilize and regulate the up and down movements of said yoke member.

The scale beam includes a bar 50 which is secured to the main scale beam by means of clamping bolts. Mounted on this bar 50 is a weight 51. The weight is formed in two sections: an upper section which is indicated at 51 in the drawings and a lower section which is indicated at 51'. Each section has a groove at the joint therebetween fitting over the bar 50 so as to prevent the weight from shifting sidewise. A fastening screw 52 passes through a slot in the bar 50 and is threaded into the lower half of the weight 51. This clamps the two sections of the weight to the bar. By loosening the screw 52 the sections of the weight may be shifted along the bar and clamped in a different position.

Carried by the weight 51 is an auxiliary weight 53. This auxiliary weight 53 is mounted on a threaded shaft 54 which in turn is mounted for rotation in spaced lugs carried by the weight 51. On the end of the shaft is a head 55 which permits the shaft to be turned. The auxiliary weight 53 is keyed to the weight 51 so that it cannot turn, but may be shifted by turning the shaft so as to vary the position of said auxiliary weight on said main weight 51. This provides a ready means for adjusting the effectiveness of the counterbalancing weight of the weighing unit.

Mounted on the supporting yoke 44 is a guide 56 which forms a segmental pocket adapted to receive the can for positioning the same on the platform of the weighing unit. This guide 56 moves up and down with the weighing platform and maintains a fixed position relative to the can during the weighing thereof.

As the turret rotates, these weighing units will be caused to move past the feeding-in station and the cans are placed one after another in the weighing units. Associated with the turret is a cover therefor which is indicated at 57. This cover has slots 58 formed in the depending skirt thereof through which the weighing beams extend, and the cover houses the upper ends of the standards, so that the only part of the weighing unit projecting beyond the cover plate is the head 43, the supporting yoke 44 and the weighing platform 45. This cover 57 rests on lugs 59 carried by the standards 37, 37.

The turret is rotated from a main actuating shaft 60 (see Fig. 3). Surrounding said actuating shaft 60 is an actuating sleeve 61. This sleeve is mounted in a bushing 62 carried by a bracket 63 depending from the support 26. There is a second bracket 64 depending from said support 26 and the inner end of the shaft 60 is mounted for rotation in a bushing 65 carried by this bracket 64. Attached to the sleeve 61 is a clutch member 66. Attached to the shaft 60 is a clutch member 67. These clutch members 66 and 67 are controlled by levers 68, 68 and a shiftable collar 69. This shiftable collar 69 is in turn controlled by a lever 70 connected by a link 71 to a rocking lever 72, and the rocking lever 72 is connected through a link 73 to a hand lever 74.

At the inner end of the shaft 60 is a pinion 75 which meshes with a gear 76 provided with a sleeve 77. Said sleeve is mounted for rotation about a shaft 78 and is connected to said shaft through a clutch which includes balls 79, 79 yieldingly moved into suitable sockets in the pinion 76 by springs 80, 80. This provides a yielding clutch which is released when there is an obstruction to the movement of the parts operated thereby. As for example, a jam in the discharging of a can from the weighing and sorting means. As soon as the jam is released, then this yielding clutch is restored to its normal condition. The shaft 78 is mounted for rotation in a bearing sleeve 81 carried by the supporting member 26. At the upper end of the shaft 78 is a pinion 82 which meshes with a gear wheel 83 mounted on the sleeve 30 and secured thereto by suitable bolts. When the clutch members 66 and 67 are moved into engagement, the turret will be rotated through this connection just described.

Likewise meshing with the gear wheel 83 is a pinion 84. The pinion 84 is fixed to a shaft 85. Said pinion 84 is provided with a sleeve 86. Mounted in said sleeve 86 are threaded bolts 87, 87. The shaft is cut away so as to provide flat faces 88, 88 with which said bolts, respectively contact. By retracting one bolt and threading in the other, the position of the pinion 84 may be shifted on said shaft, or, in other words, the shaft may be shifted within limits in the pinion 84. At the upper end of this shaft 85 is the feed wheel 18, which as shown, consists of an upper and lower series of feeding fingers projecting laterally from the central hub portion 89. A set screw 90 passing through the hub portion secures the feed wheel to the shaft 85. By loosening this set screw 90, the feed wheel, which is keyed to the shaft, can be removed therefrom for purposes which will be hereinafter more fully described. It is very essential that the feed finger shall be properly timed so as to place the cans in the pockets on the weighing platforms. The weighing platforms travel with the turret. The pinion 84 is rotated by the turret, and therefore, these threaded bolts 87 which permit the shifting of the shaft relative to the pinion, will enable the timing of the fingers, relative to the travel of the weighing platforms to be varied within limits as above noted. The lower feed wheel is shown as having the fingers and receiving dogs thereof dimensioned for operation upon cans of larger diameter. When the can is of less height, it is usually of larger diameter, and is so shown in dotted lines in Fig. 6.

Meshing with the gear 83 is a pinion 92. This pinion 92 is fixed to the shaft 78 which carries a pinion 93. The pinion 93 meshes with a pinion 94 which in turn meshes with a pinion 95 carried by the shaft 96. This shaft 96 is mounted for rotation in a bearing sleeve 97 which is formed integral with the bracket 9. At the upper end of this shaft 96 is a bevel gear 98 which meshes with a bevel gear 99 fixed to the shaft 8. This is the shaft that is connected to the timing screw, and thus it is that the timing screw is rotated through this train of gears which is fixed to and rotates with the turret. As above noted, it is desirable at times to shift the position of the timing screw relative to the path of travel of the feed chain. The gear 94 is mounted on a stub shaft which is adjustably attached to the frame of the machine, as indicated in Fig. 4. The support for the pinion 94 is capable of adjustment about the shaft 78 as a center. The bracket 9 may be shifted toward or from the path of travel of the chain, and this will bodily shift the shaft 96 and the operating position of the pinion 95. The pinion 94 is adjusted to accommodate this shifting of the set position of the pinion 95.

The table 2 is provided with an extension which completely encircles the turret 33. That portion of the table, however, which encircles the turret is depressed as indicated at 2a, so that the platform or pans of the weighing units can travel freely over this portion of the table and move to a set position determined by the weight of the can. Encircling the path of travel of the weighing units and the extension portion of the table is a guard rail 2b which is attached to suitable brackets carried by the table extension 2a. There is a projecting plate carried by the table which receives the cans as they are moved along the guide 20 by the feed wheel 18. This plate terminates at the line 100. The pan or platform of each weighing unit passes underneath the guide 20 and this projecting plate. The travel of the weighing units is so timed relative to the feed fingers 19 that the can will be pushed off from this projecting plate across the line 100 and on to the platform of the weighing unit.

Located at one side of the path of travel of the weighing units is a presser member 101. Said presser member is mounted to swing about a vertical axis on a support 102. A spring 103 normally turns said presser member in a counterclockwise direction. Said presser member has a hole 104 therethrough, and a pin 105 carried by the table and extending into the opening limits the swinging movement of the presser member. The outer end of this presser member is provided with a curved plate 106. The presser member is so disposed that as the weighing units pass the same, the can, if it is not fully seated in the pocket formed by the guide 56, will contact with the curved plate 106 carried thereby, and will be yieldingly forced against the guide or positioning pocket 56.

During the loading of the can on to the platform of the weighing unit, the scale beam is positively held from vertical movement. After the can is located on said weighing platform, then the scale beam is released so that the platform with the can thereon will move to a set position determined by the weight of the contents of the can. If the can is filled so that it contains a normal weight, then it will take one set position and remain in this set position as it travels to the discharging station of the machine. If it is overweight, then the can will move to a lower position, and will travel in this lower position to the discharging station of the machine. Likewise, if it is light weight, then it will assume a higher position than normal, and will travel in this position to the discharging station.

Figure 8:
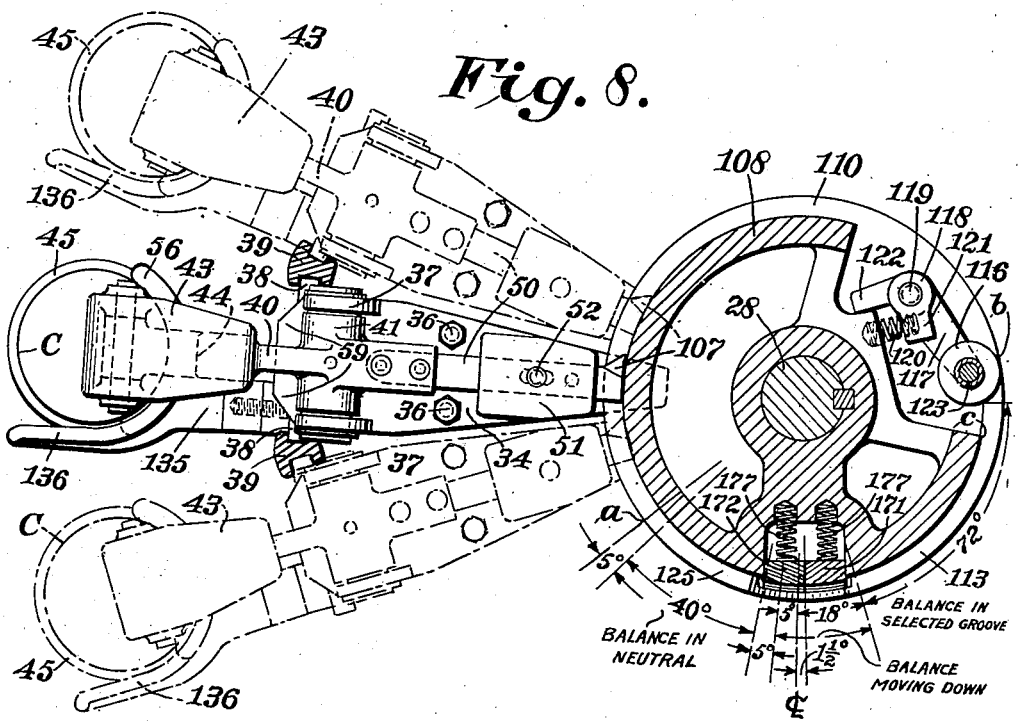
Fig. 8 is a fragmentary enlarged horizontal sectional view showing in full lines one of the weighing units and in broken lines the two adjacent weighing units, and also showing the stationary control cam associated with the units.

Means is provided for locking the scale beam against movement of the discharging station so that when the cans are removed from the weighing platforms or pans, these platforms are substantially held in a rigid vertical position. The means which locks the scale beams in a predetermined fixed position consists of control tracks associated with all of the weighing units, and along which the inner ends of the scale beams travel. The bar 50 on which the weight 51 is mounted extends all the way through the weight and is provided at its extreme inner end with a wedge-shaped director 107. Fixed to the upper end of the column 28 is a drum 108. Said drum is provided with a projecting flange 109 at the upper face thereof, and with a projecting flange 110 at the lower face thereof. Said lower flange is formed by a plate which is attached to the drum. The inner ends of the bars 50 travel between these flanges and close to the surface of the drum, but out of contact therewith. From the point a to the point b (Figures 8 and 9), the space between the two flanges is free from any obstruction so that the scale beams are free to move up or down, determined by the weight of the cans and the contents thereof. It is during this period of travel of the weighing units that each weighing pan finds its proper balanced position and remains in this position until the point b is reached. Fixed to the peripheral face of the drum and between the flanges 109 and 110 is a bar 111. This bar is spaced away from the flange 109 so as to provide a track 112 along which the end of the scale beam may pass. There is a bar 113 also attached to the peripheral face of the drum between the flanges, and between this bar 113 and the flange 110 is a track 114. Between the two bars is a track 115. The drum is provided with a cut-away portion in the peripheral face thereof and between the flanges 109 and 110 adjacent the point b. Located in this cut-away portion is a roller 116. The roller is mounted between two arms 117, 117 carried by a hub member 118 which is mounted to swing about a pivot post 119 extending through the flanges of the drum. A spring 20 bearing against a lug 121 carried by the hub, normally tends to rotate the arms in a counterclockwise direction, and thus yieldingly forces the roller 116 radially outwardly of the drum. There is a lug 122 which serves as a stop to limit the outward movement of the roller.

Figure 9:
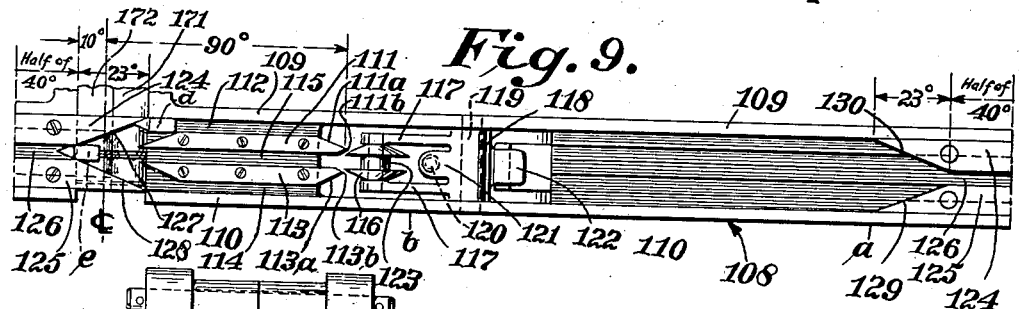
Fig. 9 is a developed view of the face of the control cam and showing the yieldable director for the underweight and overweight containers.
Figure 9A:
Fig. 9a is an enlarged developed view of a portion of the control drum in the region where the scale beams are directed and locked in the position determined by the weight of the can and the contents thereof.
Figure 18:
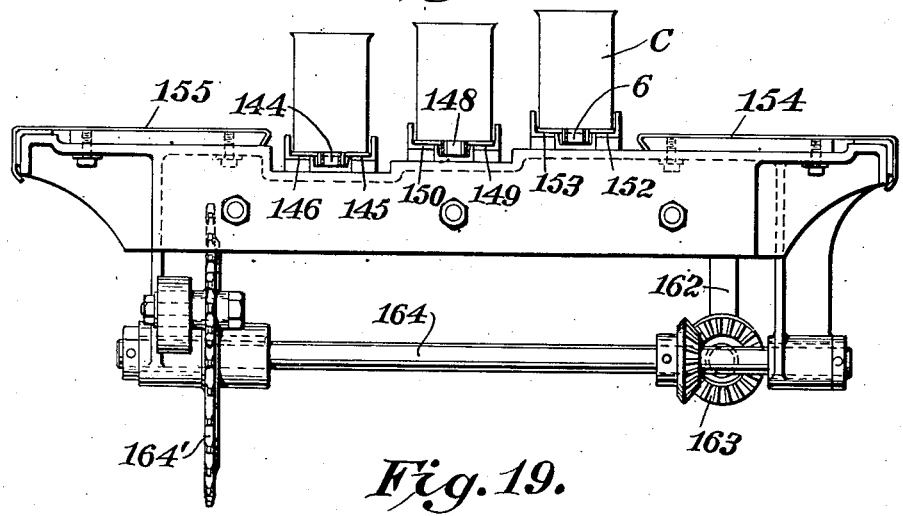
Fig. 18 is a sectional view on the line 18—18 of Fig. 17.
Figure 19:
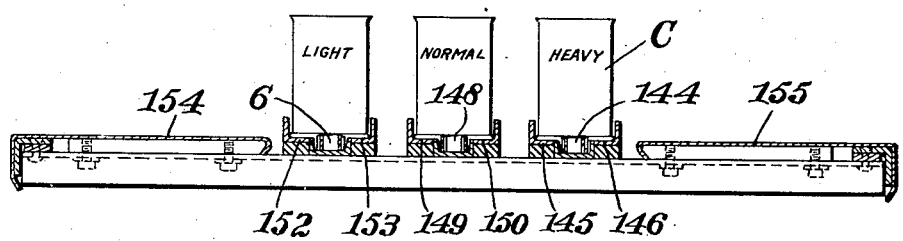
Fig. 19 is a sectional view on the line 19—19 of Fig. 17.
Figure 20:
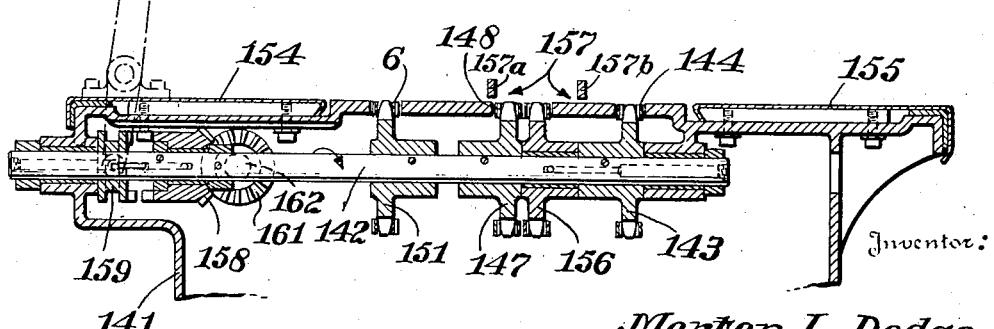
Fig. 20 is a sectional view on the line 20—20 of Fig. 17.

This roller 116 is provided with a central groove 123, which groove is of the same width as the track 115 and is in line therewith. It is also of the same width as the end of the scale beam bar 50. The roller at each side of this central groove 123 is beveled as indicated in Fig. 9 of the drawings. The end of the bar 111 is inclined as indicated at 111a. The end of the bar 113 is inclined as indicated at 113a. This bar 111 has at its inner side, an oppositely inclined face 111b. The bar 113 also has at its inner face an oppositely inclined face 113b.

As the end of the scale beam approaches the roller 116, the director 107 will usually pass either into the groove 123 of the roller or completely at one side or the other thereof. If it is above the groove 123, so as to strike the inclined face of the roller, then it will be directed against the inclined face 111a, and this will lead the end of the scale beam into the track 112. The end of the scale beam is of such width that it can pass freely along this track 112, but will be held from any appreciable vertical movement. On the other hand, if the director passes entirely below the groove 123 of the roller 116, it will contact with the inclined face 113a and be directed into the track 114, which is similarly dimensioned so as to hold the scale beam from any appreciable vertical movement while in this trackway. If the director passes into the groove 123, then it will be directed into the track 115 and again the scale beam will be held from any appreciable movement thereof. Assuming that the director contacts with the extreme outer edge of the upper tapered face of the roller 116 so that it cannot pass into this groove, or be directed upwardly on to the face 111a of the bar 111, under such a condition, the roller will yield and the director 107 will strike the inclined face 111b of the bar 111 and this will cause the scale beam end to pass along the track 115. If this director strikes the extreme edge of the lower tapered surface, then it will contact with the surface 113b and be directed into the track 115.

From the above it will be apparent that when the can is under-weight, the weight on the scale beam will force the outer end of the scale beam to a position below normal, and the director will cause the end of the scale beam to enter the track 114. If the can is of normal weight, then this end of the scale beam will pass along the track 115, and if it is over-weight, then it will cause the end of the scale beam and cause the director to pass along the track 112. These tracks will hold the scale beam from vertical movement, and it is while the scale beams are passing along these tracks that the cans are removed from the weighing platforms or pans at the discharging station of the machine.

It is desirable to bring all of the weighing platforms back to a normal position for loading. This is accomplished by the bars 124 and 125. These bars are placed along the peripheral face of the drum between the flanges 109 and 110 and fill the space, except for the track 126. The end of the bar 124 is inclined as indicated at 127. The end of the bar 125 is inclined as indicated at 128. The ends of the bars 111 and 113 are inclined also. The end of one of the scale beams is indicated at d. It is just leaving the track 112, and the inclined end of the director is contacting with the inclined wall 127, and also the rear edge of the scale beam is contacting with the inclined surface on the bar 111. At this time, the can has been removed from the weighing pan or platform, and the weight overbalances the pan so as to force the end of the scale beam downward.

Friction bars 171 and 172 are provided for the purpose of retarding the downward movement of the end of the scale beam when it leaves the tracks 112 and 115. The friction bars 171 and 172 are similar in construction. There are upstanding bracket members carried by the flange 109 of the drum. These bracket members are indicated at 173 and 174 respectively. The pivot rod 176 passes through the bracket members and the friction bars 171 and 172 are mounted on this rod for free swinging movement. There is a spring 177 in the rear of each friction bar which normally presses the same outward until it contacts with the bar 125. Each friction bar has on its outer face a V-shaped groove 178. The faces are rounded and the groove extends around onto the side face thereof. The track bar 125 and also the track bar 124 are cut away to a slight extent in the region of these friction bars so that the friction bars normally lie pushed outward to a position so that the end of the scale beam will contact with the same. If the end of the scale beam is moving along the track 112, it will engage the friction bar 171 and will gradually slide down the face of the friction bar until it registers with the V-shaped groove 178 therein. As it passes onto the friction bar 172, it will travel along the V-shaped groove 178. If this end of the scale beam does not pass into the V-shaped groove on the bar 171, it will certainly pass into the groove on bar 172 and will be directed into the track 126. If the end of the scale beam is passing along the track 115, it will enter the V-shaped groove 178 in the friction bar 171 and will pass along the V-shaped groove in the friction bar 17 and enter the track 126. If for any reason the end of the scale beam should not be retained in this V-shaped groove, it will contact with the face of the bar beneath the groove and necessarily force the bar backward as it moves down into contact with the tapered end 128 of the bar 125. These friction bars yieldingly pressed outward will, of course, move back against the tension of their springs to allow the end of the scale beam to enter the V-shaped groove. Thus it is that the scale beams when they leave their tracks after the containers are removed therefrom and move back into the common track 126 are controlled so that there is no rapid dropping of the end of the scale beam when the scale platform is unloaded.

This track 126 is of sufficient length so that the scale beam end is following the track when the can is loaded on to the pan or platform of the weighing unit. The discharge end of the bar 125 is inclined downwardly as indicated at 129. The end of the bar 124 is inclined upwardly as indicated at 130. When the end of the scale beam passes out of the track 126, then said scale beam is free to move up or down determined by the weight of the can and its contents. If it is of normal weight, then there will be little or no up or down movement. If it is of over-weight, then the inclined face 130 will prevent sudden movements of the scale beam and aid in bringing the scale beam to a fixed balanced position without bouncing. Likewise, if it is of under-weight, then the inclined face 129 will aid in the bringing of the scale beam to a balanced position.

The means for removing the cans from the platform of the weighing unit and for sorting the same according to weight, will now be described. The table 2 at the discharge station is provided with three different levels. The section 2c is on the lowest level, and the can which is overweight and marked "heavy" in the drawings, is transferred from the weighing pan or platform on to this section of the table. Attached to this section of the table is a plate 131. The weighing platform or pan of the scale, when the scale beam is passing along the track 112, is so positioned that it passes just above this projecting plate 131 (see Fig. 13). The normal weight can will pass on to the section 2d of the table which is slightly above the section 2c. Associated with this section 2d is a plate 132. The edge of this plate 132 serves as a guide for the can of heavy weight, and assists in removing the can from the pan or platform of the weighing unit. The plate 132 extends all the way across the path of travel of the can of heavy weight, and is suspended so that the pan or platform on which the heavy can is supported will pass beneath the plate. Thus it is that the edge of the plate will serve as a guide for directing the can along the surface of the table 2c. There is also a guide plate 133 and the can of heavy weight will pass between the plates 132 and 133 and be forced along said surface 2c until within the range of the feed chain running over a sprocket wheel 134. One can will crowd another along until the cans are brought into range of these traveling chains. Associated with each weighing unit is a bracket which aids in the discharge of the can from the scale pan or platform. This bracket is indicated at 135. Said bracket is clamped to one of the standards 37, and is provided with a projecting arm 136 which is so disposed relative to the guide 56 that the can is normally out of contact with the arm, so that the arm will not, in any way, prevent the scale beam from reaching its proper balanced position. When, however, the can contacts with the plate 132 and is crowded backward on the pan, it will be brought into engagement with this arm 136 and the arm will forcibly move the can on to the plate 131 and finally pass the can after it is well out on the plate.

The can of normal weight is discharged on to the surface 2d of the table. Associated with the surface 2e which receives the cans of light weight, is a projecting plate 137. The edge of this projecting plate serves as a guide for the can of normal weight, just as the plate 132 serves as a guide for the can of heavy weight. In a similar manner, the cans of normal weight are forced along the plate 132 on to the surface 2d and finally into range of a chain running over a sprocket wheel 138. The cans of light weight will be so positioned as to be discharged on to the face 2e of the table, and this is the normal face of the table. There is a guide 139 which directs the cans into contact with the guide 20b carried by the cover plate 21, and this guide will direct the cans into the path of travel of the feed chain which delivers the cans to the machine. Associated with the plate 132 is a guide rail 132'. The heavy weight can is guided by the edge of the plate 132 into contact with this guide rail 132'. There is likewise a guiding rail in alinement with the guiding edge of the plate 133. Associated with the plate 137 is a guide rail 137', and the guiding edge of this plate 137 leads into alinement with the guide rail 132'. The guide rail 132' serves in conjunction with the guide rail 137' to direct the cans of normal weight. The cans of light weight are directed by the guides 139 and 20b into contact with the guide rail 25, and this guide rail, together with the guide rail 137' directs the cans of light weight into the range of action of the can conveying chain 6.

In the manner described above, the cans at the discharge station are sorted and taken away from the weighing units along three different paths of travel, one for the heavy cans, another for the cans of normal weight, and the third for the cans of light weight.

Extending laterally from the frame 2 of the weighing and sorting machine is a frame extension 140. At the outer end, said frame extension is mounted on legs 141. Journaled in this frame extension is a shaft 142. This shaft carries a sprocket wheel 143, and a feed chain 144 travels over this sprocket wheel and the sprocket wheel 134 and moves the heavy cans along the track defined by the guide rails 146 and 150. The shaft 142 carries a sprocket wheel 151. The main feed chain travels over this sprocket wheel, and the cans are conveyed along the track defined by the guide rails 152 and 153. Extending alongside of the track for the light weight cans is a stainless steel plate 154. Extending along the track for the heavy weight cans is a stainless steel plate 155. These plates constitute a patching table. The operator standing beside the patching table 154 may add food product to the light weight cans to bring them up to normal condition, and an operator standing by the patching table 155 may remove food product from heavy weight cans to likewise bring them to normal condition.

There is a sprocket wheel 156 on the shaft 142 which is in alinement with a track 157, and the guide rails are all arranged so that all of the cans finally find their way into this track 157 and are fed along the same to the clincher. The shaft 142 carries a bevel gear 158 which is loosely mounted thereon and which may be connected to the shaft through a clutch 159 controlled by a hand lever 160. Meshing with the bevel gear 158 is a bevel gear 161 carried by a shaft 162. This shaft carries at its inner end a bevel gear 163 meshing with a bevel gear on a shaft 164. A sprocket chain 165 travels over a sprocket wheel 164' on this shaft 164, and also over a sprocket wheel 167 on an auxiliary shaft 168. This auxiliary shaft 168 carries a sprocket wheel 169 which is connected through a sprocket chain 170 with the sprocket wheel 166 which is fixed to the sleeve 61. Thus it is that the feed chains are all driven from the main actuating shaft and in proper timing therewith.

From the above it will be apparent that the filled cans may be taken promiscuously from a line and are timed so that they are fed one after another on to the weighing platform or pan of a traveling weighing unit. While the filled can is being loaded on to the weighing unit, the scale pan or platform is held from vertical movement while it is receiving the can. After the can is loaded on to the platform or pan, then the scale beam is released, so that the platform or pan will move to a predetermined position according to the weight of the can and the contents thereof. As the weighing units approach the discharge station, the scale beam is caused to pass along a track determined by the weight of the can and its contents, and the scale beams will be locked from vertical movement in one of three different positions. The cans of normal weight will be in one line of travel, the cans of lighter weight will be in another position of travel, and the cans of heavy weight will be in the third position of travel. The cans are taken off from the scale beams and directed along tracks so that all of the cans of normal weight will pass centrally along the patching table, while the cans of light weight will pass along one side of the patching table, and the cans of heavy weight will pass along the other side of the patching table, thus the cans can be made of substantially normal weight while they are traveling and will then be brought into line and directed to the clinching machine.

Inasmuch as the weighing units are each self-contained, any one may be quickly removed and another substituted therefor, so as not to delay the operation of the weighing and sorting machine. If, for any reason, it is desirable to render the weighing and sorting machine inoperative, this can be done without interfering with the operation of the filling machine and the clincher. The cover plate 21 is raised so as to expose the feed chain which travels beneath the same. The feed wheel 18 is detached from its supporting shaft and removed. The timing screw or spiral is also released and removed, and this will give a free path of travel for the cans along with the main conveying chain from the filler to the clincher.

It is obvious that many changes may be made in the details of construction without departing from the spirit of the invention as set forth in the appended claims.

Having thus described the invention, what I claim as new and desire to secure by Letters Patent, is—

1. In a weighing and sorting machine for filled cans, the combination of a supporting frame, a rotatable turret, a series of self-contained weighing units removably secured to said turret, each including a scale beam, means removably carried by the turret for pivotally supporting the scale beam, a yoke suspended at the outer end of the scale beam, a weighing platform carried by said yoke, a stationary drum having projecting spaced flanges, each scale beam having the end thereof projecting between said flanges and carrying a wedge-shaped director, bars secured to said drum and forming tracks along which said director is adapted to pass, said tracks being disposed so as to hold said scale beams in set positions during certain angular travel of the weighing units, and said drum being constructed so that said scale beam is free to move during other angular movements of the turret and a yieldingly mounted diverting roller located at the receiving ends of said tracks, said roller having spaced oppositely disposed cone-shaped members cooperating with said directors for directing the scale beams into the tracks.

2. In a weighing and sorting machine for filled cans, the combination of a frame, a rotatable turret, a series of weighing units carried thereby, each including a scale beam and a can receiving platform, means for placing cans on the platforms, selective means for removing the cans at different stations determined by the position of the weighing platform, a stationary drum concentric to the axis of said turret, vertically spaced tracks for receiving in succession the ends of the scale beams while passing the removing station for holding the scale beam in a set position determined by the position of the weighing platform as it approaches said tracks, said tracks merging into a single track at the loading station for holding said platforms in a set position while placing the cans thereon, and said drum being free from tracks so as to permit the scale beams to move freely to a set position determined by the weight of the can as it travels from the loading station to the removing station and a yieldingly mounted diverting roller located at the receiving ends of said tracks, said roller having spaced oppositely disposed cone-shaped members cooperating with said directors for directing the scale beams into the tracks.

3. In a weighing and sorting machine for filled cans, the combination of a frame, a rotatable turret, a series of weighing units carried thereby, each including a scale beam and a can receiving platform, means for placing the cans on the platforms, selective means for removing the cans at different stations determined by the position of the weighing platform, a stationary drum concentric to the axis of said turret, vertically spaced tracks for receiving in succession the ends of the scale beams while passing the removing station for holding the scale beam in a set position determined by the position of the weighing platform as it approaches said tracks, said tracks merging into a single track at the loading station for holding said platforms in a set position while placing the cans thereon, and said drum being free from tracks so as to permit the scale beams to move freely to a set position determined by the weight of the can as it travels from the loading station to the removing station, each scale beam having a wedge-shaped director on the inner end thereof, said tracks having the receiving ends thereof inclined for cooperation with said director, and a yieldingly mounted diverting roller having cone-shaped faces at the opposite sides thereof located at the receiving ends of said tracks and cooperating with said directors for directing the scale beams into the tracks.

4. In a weighing and sorting machine for filled cans, the combination of a series of traveling weighing units, each including a scale beam and a can receiving platform, a stationary member having a track along which the ends of the scale beam travel for holding the scale beams in a set position during the loading of a can onto a platform, said track terminating so as to permit free movement of the scale beams after the cans are loaded onto the platforms for bringing the scale beam to a set position determined by the weight of the can, said stationary member having a series of spaced tracks along which the end of the scale beam passes selectively during the unloading of the platforms whereby cans of under-weight and cans of over-weight are discharged at different points from the platforms, said stationary member having a space between the series of tracks controlling the scale beam for unloading and the single track for controlling the scale beam during loading, and a friction bar located in said last-named space with which the ends of the scale beams contact to prevent sudden movements of the scale beams due to the unloaded condition thereof when the cans are removed from the platform.

5. In a weighing and sorting machine for filled cans, the combination of a series of traveling weighing units, each including a scale beam and a can receiving platform, a stationary member having a track along which the ends of the scale beam travel for holding the scale beams in a set position during the loading of a can onto a platform, said track terminating so as to permit free movement of the scale beams after the cans are loaded onto the platforms for bringing the scale beam to a set position determined by the weight of the can, said stationary member having a series of spaced tracks along which the end of the scale beam passes selectively during the unloading of the platforms whereby cans of under-weight and cans of over-weight are discharged at different points from the platforms, said stationary member having a space between the series of tracks controlling the scale beam for unloading and the single track for controlling the scale beam during loading, and a friction bar located in said last-named space with which the ends of the scale beams contact to prevent sudden movements of the scale beams due to the unloaded condition thereof when the cans are removed from the platform, said friction bar having a V-shaped groove extending across the face thereof in line with the single track guiding the scale beam during loading, and yielding means for normally forcing said friction bar into position for contact with the end of the scale beam.

6. In a weighing and sorting machine for filled cans, the combination of a conveyor, a series of weighing units removably carried thereby, each including a scale beam and a can receiving platform, each scale beam at the inner end thereof carrying a directing member, a stationary member along which the ends of the scale beams move, said stationary member having spaced bars forming tracks along which the directing members of the scale beams may pass, the bars at the receiving ends of the tracks being inclined to aid in guiding the director into the tracks, and a yieldingly mounted roller having spaced tapered surfaces for guiding the director on the end of the scale beam into engagement with the inclined end of the tracks.

7. In a weighing and sorting machine for filled cans, the combination of a conveyor, a series of weighing units carried thereby, each including a scale beam and a can receiving platform, each scale beam at the inner end thereof carrying a directing member, a stationary member having spaced bars forming tracks along which the directing members of the scale beams may pass, the bars at the receiving ends of the tracks being inclined to aid in guiding the director into the tracks, and a yieldingly mounted diverter for guiding the director on the end of the scale beam into engagement with the inclined end of the tracks, said diverter having a passage centrally therethrough in line with a central track so as to permit the scale beam to pass the diverter into said central track when the can is of normal weight.

8. In a weighing and sorting machine for filled cans, the combination of a conveyor, a series of weighing units carried thereby, each including a scale beam and a can receiving platform, each scale beam at the inner end thereof carrying a directing member, a stationary member having spaced bars forming tracks along which the directing members of the scale beams may pass, the bars at the receiving ends of the tracks being inclined to aid in guiding the director into the tracks, and a yieldingly mounted roller having spaced members with their outer faces beveled, thus providing a passage for the director on the scale beam so that it may enter the centrally disposed track when the can is of normal weight, the outer beveled faces of said spaced members serving to divert the end of the scale beam so that it will contact with the inclined face of the bar and pass into the track associated therewith.

9. In a weighing and sorting machine for filled cans, the combination of a series of traveling weighing units, each including a scale beam and a can receiving platform, a stationary member having a track along which the ends of the scale beam travel for holding the scale beams in a set position during the loading of a can onto a platform, said track terminating so as to permit free movement of the scale beams after the cans are loaded onto the platforms for bringing the scale beam to a set position determined by the weight of the can, said stationary member having a series of spaced tracks along which the end of the scale beam passes selectively during the unloading of the platforms whereby cans of under-weight and cans of over-weight are discharged at different points from the platforms, said stationary member having a space between the series of tracks controlling the scale beam for unloading and the single track for controlling the scale beam during loading and a vertically disposed friction bar located in said space with which the ends of the scale beams contact after they leave the tracks in which they are traveling for preventing sudden movement of the scale beams as said end beams are positioned for entering the single track leading to the loading station.

10. In a weighing and sorting machine for filled cans, the combination of a series of traveling weighing units, each including a scale beam and a can receiving platform, a stationary member having a track along which the ends of the scale beam travel for holding the scale beams in a set position during the loading of a can onto a platform, said track terminating so as to permit free movement of the scale beams after the cans are loaded onto the platforms for bringing the scale beam to a set position determined by the weight of the can, said stationary member having a series of spaced tracks along which the end of the scale beam passes selectively during the unloading of the platforms whereby cans of underweight and can of overweight are discharged at different points from the platforms, said stationary member having a space between the series of tracks controlling the scale beam for unloading and the single track for controlling the scale beam during loading, said stationary member having also a space between the single track and the series of tracks so as to free the scale beam for selectively entering one of the series of tracks depending upon the weight of the can, a yielding diverting roller located in the space at the receiving ends of the series of tracks and cooperating with said directors for directing the beam into the tracks and a friction bar located at the ends of the series of tracks with which the ends of the scale beams contact to prevent sudden movement of the scale beams when said ends leave the tracks.

MERTON L. DODGE.